United States Patent
Park et al.

(10) Patent No.: US 7,545,470 B2
(45) Date of Patent: Jun. 9, 2009

(54) FRINGE FIELD SWITCHING MODE LCD WITH FIRST AND SECOND PIXEL ELECTRODES EACH HAVING A PLURALITY OF SLITS WHERE THE SECOND ELECTRODES ARE POSITIONED BETWEEN THE FIRST ELECTRODES AT A PREDETERMINED ANGLE

(75) Inventors: Jun Baek Park, Kyoungki-do (KR); Hyang Yul Kim, Kyoungki-do (KR); Youn Hak Jeong, Kyoungki-do (KR)

(73) Assignee: Hydis Technologies Co., Ltd, Gyeonggi-Do (KR)

( * ) Notice: Subject to any disclaimer, the term of this patent is extended or adjusted under 35 U.S.C. 154(b) by 378 days.

(21) Appl. No.: 11/215,235

(22) Filed: Aug. 30, 2005

(65) Prior Publication Data

US 2006/0279684 A1 Dec. 14, 2006

(30) Foreign Application Priority Data

Jun. 14, 2005 (KR) ...................... 10-2005-0050822

(51) Int. Cl.
*G02F 1/1343* (2006.01)
(52) U.S. Cl. ........................................ 349/141; 349/48
(58) Field of Classification Search ................... 349/48, 349/141; 345/87–93
See application file for complete search history.

(56) References Cited

U.S. PATENT DOCUMENTS

| 6,600,542 | B2 * | 7/2003 | Kim et al. | 349/141 |
| 2002/0140649 | A1 | 10/2002 | Aoyama et al. | |
| 2002/0163604 | A1 * | 11/2002 | Kim et al. | 349/43 |
| 2003/0025661 | A1 * | 2/2003 | Karman et al. | 345/87 |

FOREIGN PATENT DOCUMENTS

JP 2005-070747 3/2005

* cited by examiner

*Primary Examiner*—David Nelms
*Assistant Examiner*—John Heyman

(57) ABSTRACT

A fringe field switching mode LCD includes a lower substrate having a gate bus line and a data bus line arranged to cross each other and form unit pixels and a counter electrode and a pixel electrode positioned within each unit pixel region with a gate insulator interposed between them and an upper substrate provided with a color filter corresponding to each pixel region and bonded to the lower substrate with a liquid crystal layer interposed between them. The pixel electrode includes first pixel electrodes positioned on the gate insulator while being spaced from each other and second pixel electrodes positioned between the respective first pixel electrodes with a predetermined angle relative to them.

3 Claims, 4 Drawing Sheets

FRINGE FIELD SWITCHING MODE LCD WITH FIRST AND SECOND PIXEL ELECTRODES EACH HAVING A PLURALITY OF SLITS WHERE THE SECOND ELECTRODES ARE POSITIONED BETWEEN THE FIRST ELECTRODES AT A PREDETERMINED ANGLE

BACKGROUND OF THE INVENTION

1. Field of the invention

The present invention relates to a fringe field switching mode LCD, and more particularly to a fringe field switching mode LCD adapted to adjust the angle between the liquid crystal director and the composite electric field in the fringe field switching mode to improve the gray-to-gray response time.

2. Description of the Prior Art

A fringe field switching mode (hereinafter, referred to as FFS-mode) LCD has been proposed to improve the low aperture ratio and transmittance of in-plane switching mode (hereinafter, referred to as IPS-mode) LCDs, as disclosed in Korean Registered Patent No. 10-0341123.

FIG. 1 shows a conventional FFS-mode LCD.

Referring to the drawing, the FFS-mode LCD 10 includes a lower glass substrate 11; a counter electrode 12 and a pixel electrode 13 formed on the lower glass substrate 10 using ITO with a gate insulator 14 interposed between them; an upper glass substrate 15; and a color filter 16 formed on the upper glass substrate 15 with a liquid crystal layer 17 interposed between them, which is composed of a number of liquid crystal molecules. The lower and upper glass substrates 11 and 15 are bonded to each other.

The FFS-mode LCD 10 constructed as above has higher aperture ratio and transmittance than IPS-mode LCDs, because the counter electrode 12 and the pixel electrode 13 are made of a transparent conductor. In addition, the spacing between the counter electrode 12 and the pixel electrode 13 is smaller than that between the upper and lower glass substrates 11 and 15 to establish a fringe field between the counter electrode 12 and the pixel electrode 13. As a result, even the liquid crystal molecules existing on top of the electrode 13 are operated and improve the transmittance.

The transmittance control in the FFS-mode LCD is performed by controlling the twist angle of liquid crystals. For a high transmittance, the liquid crystals are rubbed while director being about 83° relative to the electric field direction, as shown in FIG. 2.

The rising response time of the liquid crystals is determined by the following equation:

$$\tau_{on} = r_1 / \{N - (\pi^2/d^2)/K_2\} \quad \text{(Equation 1)}$$

In Equation 1, the dielectric torque N in the denominator determines the rising response time and the remaining values are constants. The dielectric torque N is expressed as follows:

$$N = |\Delta\epsilon(n \cdot E)n \times E| = \Delta\epsilon E_0^2 \sin 2\Psi \quad \text{(Equation 2)}$$

It is clear from both equations that, under the condition of the same electric field intensity, the fastest rising response time is obtained when $\sin 2\Psi = 1$ ($\Psi = 45°$), particularly, when the angle between the alignment direction of the liquid crystal molecules and the direction of the initial electric field is 45°.

FIG. 3 shows the angle between the electric field and the average director of the liquid crystal molecules corresponding to each gray level, when the gray level varies in the FFS-mode LCD. It is clear from FIG. 3 that, as the gray level increases and the angle approaches 45°, the rising gray-to-gray response time becomes faster and, as the angle goes beneath 45° and becomes smaller, the rising gray-to-tray response time becomes slower again.

SUMMARY OF THE INVENTION

Accordingly, the present invention has been made to solve the above-mentioned problems occurring in the prior art, and an object of the present invention is to provide a fringe field switching mode LCD capable of maintaining the fastest response time regardless of varying gray level.

In order to accomplish this object, there is provided a fringe field switching mode LCD including a lower substrate having a gate bus line and a data bus line arranged to cross each other and form unit pixels and a counter electrode and a pixel electrode positioned within each unit pixel region with a gate insulator interposed between them and an upper substrate provided with a color filter corresponding to each pixel region and bonded to the lower substrate with a liquid crystal layer interposed between them, wherein the pixel electrode includes first pixel electrodes positioned on the gate insulator while being spaced from each other and second pixel electrodes positioned between the respective first pixel electrodes with a predetermined angle relative to them.

The first pixel electrodes are preferably positioned on top of the second pixel electrodes while being electrically separated thereto with a protective layer being interposed between them.

Preferably, the predetermined angle is equal to the angle between the electric field caused by the first pixel electrodes and that caused by the second pixel electrodes and is in the range of 30-60°.

The direction of the composite electric field of the electric field caused by the first pixel electrodes and that caused by the second pixel electrodes preferably maintains a predetermined angle relative to the direction of the liquid crystal molecules of the liquid crystal layer.

The angle between the composite electric field and the liquid crystal director is preferably in the range of 30-60°.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
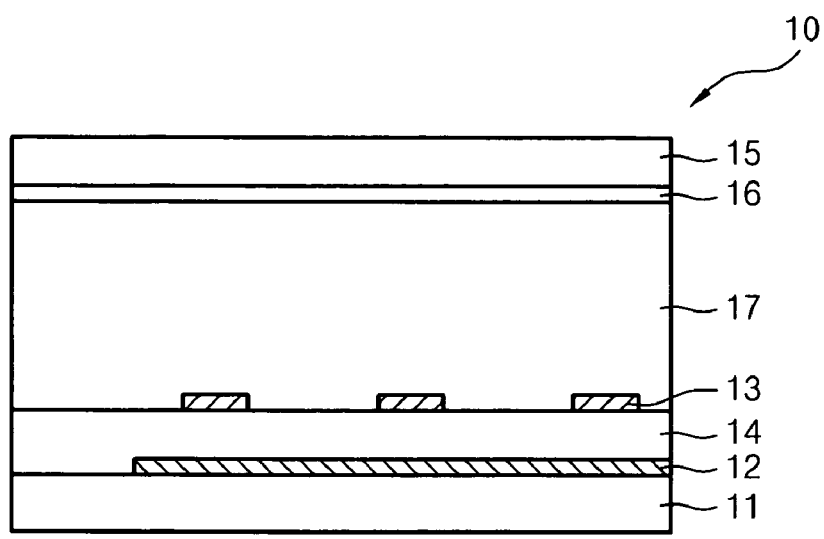
FIG. 1 is a sectional view showing a conventional FFS-mode LCD.
Figure 2:
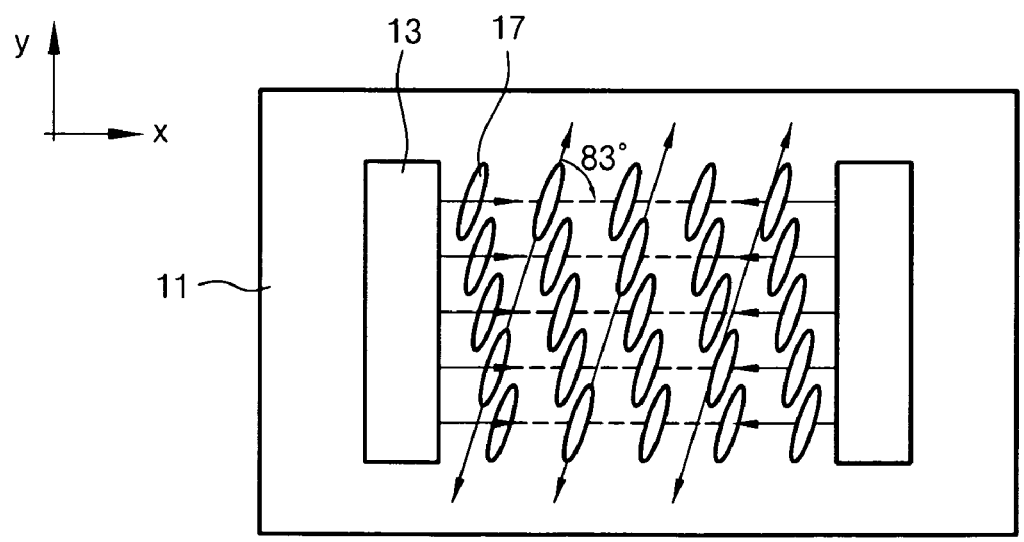
FIG. 2 is a top view showing the pixel electrode and the initial liquid crystal molecules' direction of the FFS-mode LCD shown in FIG. 1.
Figure 3:
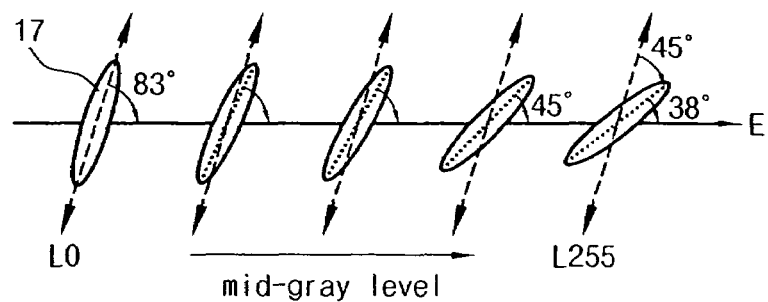
FIG. 3 shows the change of angle between the liquid crystal director and the electric field as the gray level varies in the FFS-mode LCD shown in FIG. 1.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 4:
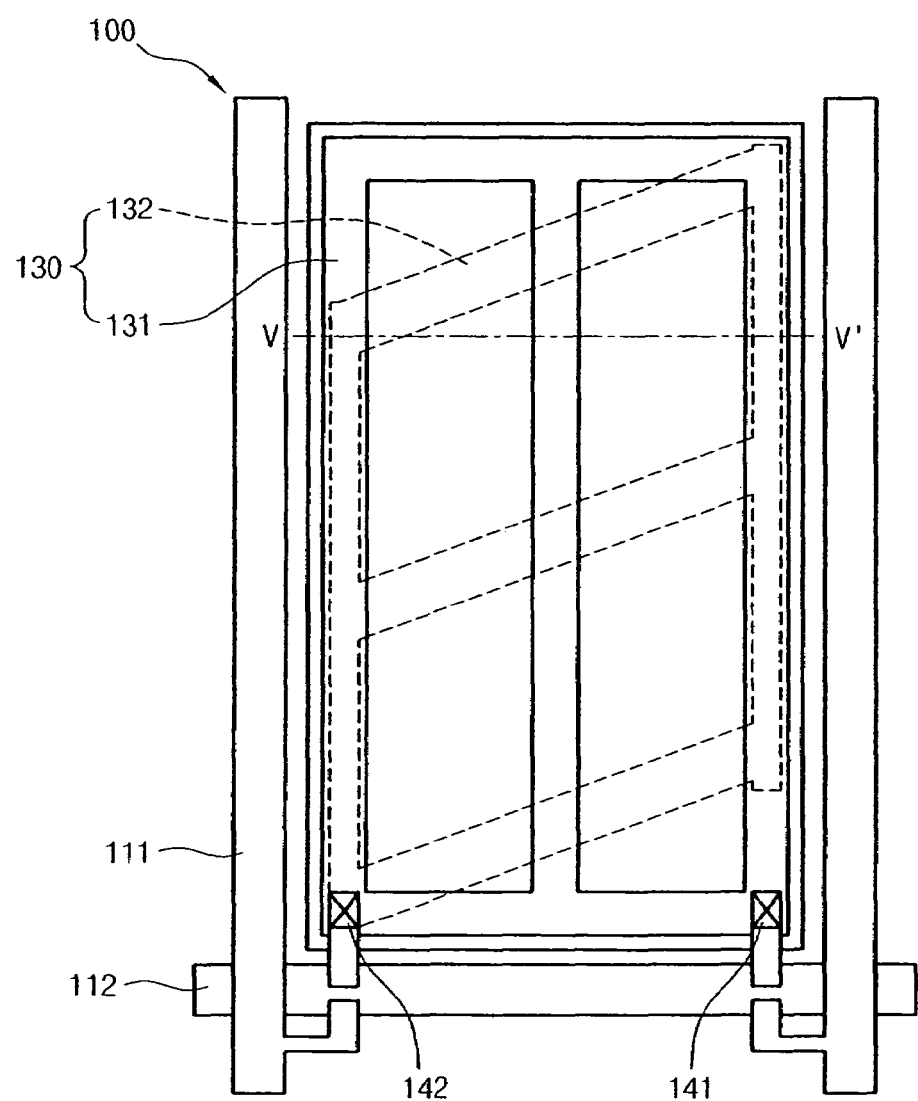
FIG. 4 is a top view showing an FFS-mode LCD according to an embodiment of the present invention.
Figure 5:
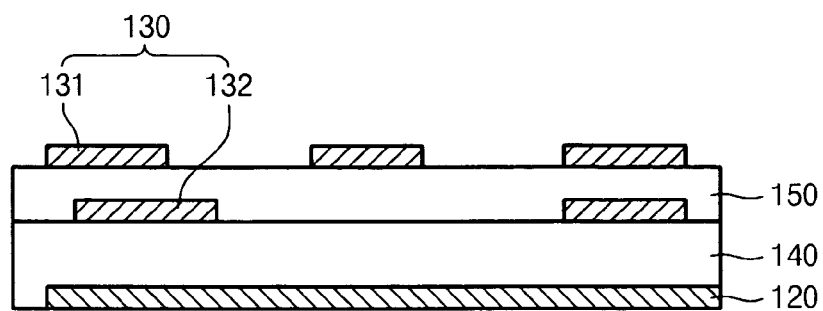
FIG. 5 is a sectional view taken along line V-V' of the FFS-mode LCD shown in FIG. 4.
Figure 6:
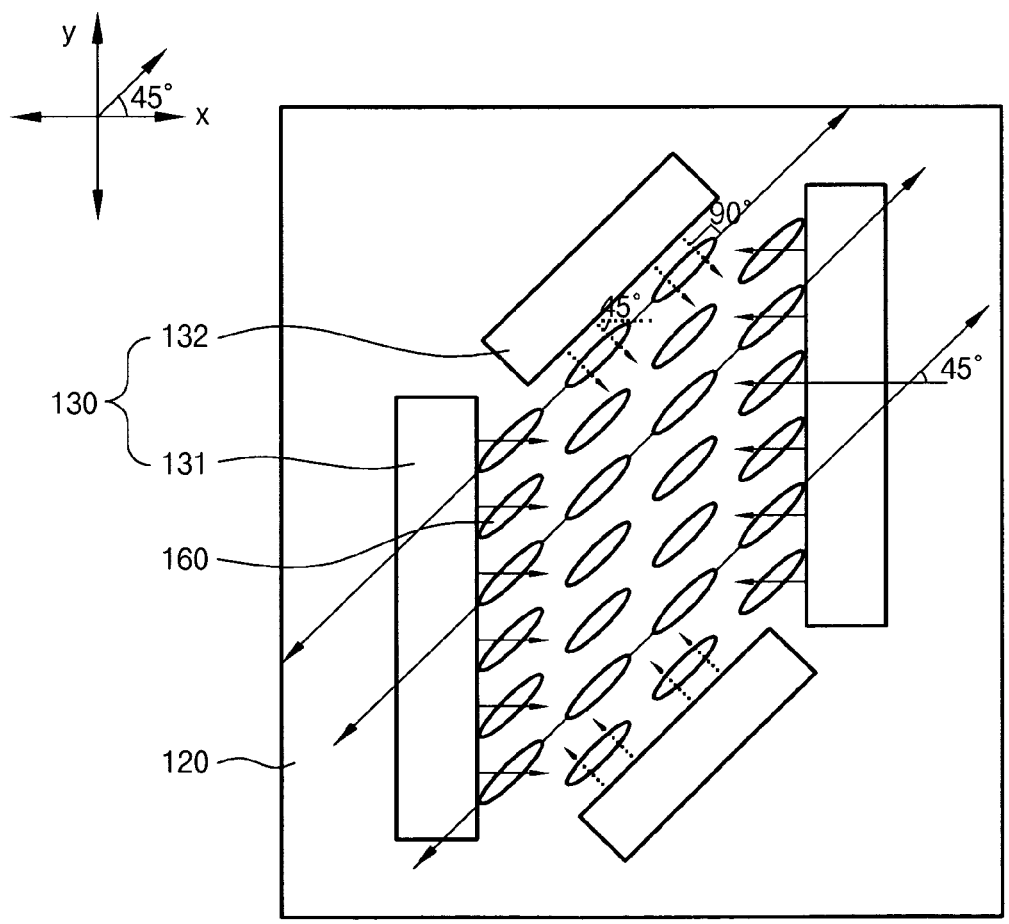
FIG. 6 is a top view showing the pixel electrode and the initial liquid crystal molecules' direction of the FFS-mode LCD shown in FIG. 4.
Figure 7:
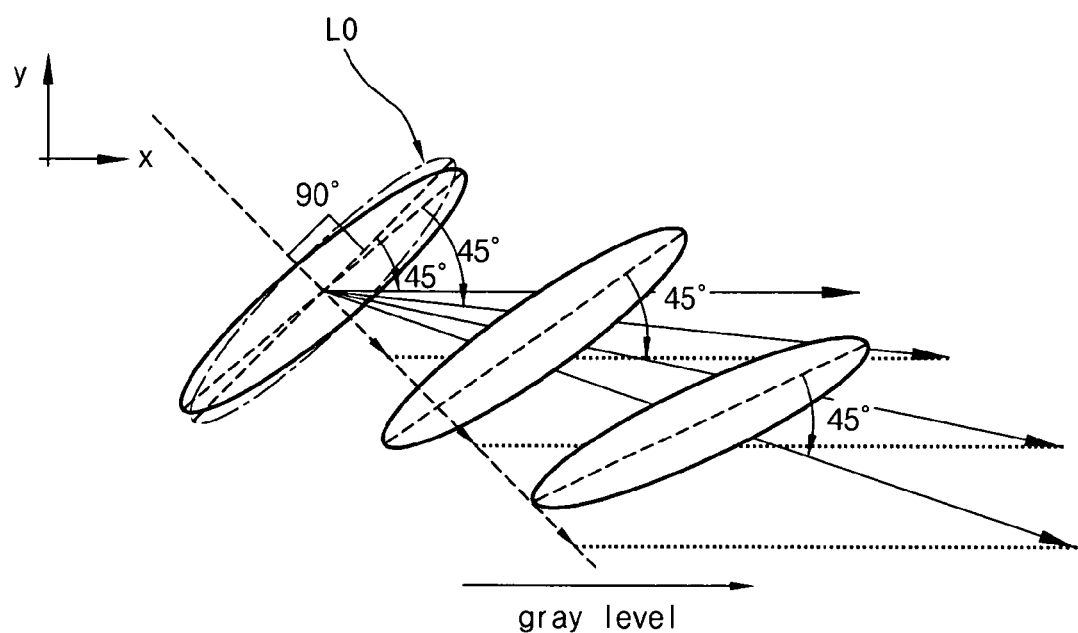
FIG. 7 shows the change of angle between the liquid crystal director and the electric field as the gray level varies in the FFS-mode LCD shown in FIG. 7.

FIG. 4 is a top view showing an FFS-mode LCD according to an embodiment of the present invention and FIG. 5 is a sectional view taken along line V-V' of the FFS-mode LCD shown in FIG. 4.

Referring to the drawings, the FFS-mode LCD 100 includes a lower substrate (not shown) having a gate bus line 112 and a data bus line 111 arranged to cross each other and form unit pixels, as well as a counter electrode 120 and a pixel electrode 130 positioned in each unit pixel region with a gate insulator 140 interposed between them and an upper substrate (not shown) having a color filter (not shown) corresponding to each pixel region and bonded to the lower substrate with a liquid crystal layer (not shown) interposed between them. The components not shown in the drawings can be easily understood by those skilled in the art and detailed description thereof will be omitted.

The pixel electrode 130 includes first pixel electrodes 131 positioned on the gate insulator 140 while being spaced from each other and second pixel electrodes 132 positioned between the respective first pixel electrodes 131 with a predetermined angle relative to them.

The first and second pixel electrodes 131 and 132 may be positioned on the same layer or on different layers with a protective layer 150 interposed between them. The first and second pixel electrodes 131 and 132 are electrically connected to respective data bus lines 111, 111a via contact holes 141 and 142.

The liquid crystal director 160 of the liquid crystal layer are aligned with an angle of 45° relative to the electric field from the first pixel electrode 131. The angle between the first and second pixel electrodes 131 and 132 is equal to the angle between the electric field direction of the first pixel electrodes 131 and that of the second pixel electrodes 132 and is in the range of 30-60°. The most preferable angle in this range is 45°.

Such an angular range is aimed to obtain an angle of 30-60°, preferably 45°, between the composite electric field, which combines the electric field of the first pixel electrodes 131 with that of the second pixel electrodes 132, and the liquid crystal director 160. As a result, the angle between electric field direction of the second pixel electrodes 132 and the liquid crystal director 160 is about 90°.

In the FFS-mode LCD 100 constructed as above, the angle between the electric field direction of the first pixel electrodes 131 and the alignment direction of the liquid crystal molecules 160 is 30-60°, preferably 45°, and the angle between the second pixel electrodes 132 and the electric field of the first pixel electrodes 131 is 30-60°, in order to improve the rising gray-to-gray response time. The liquid crystal molecules' direction maintains an angle of 45° relative to the initial composite electric field direction, even when the gray level varies. Therefore, the angle between the initially-applied composite electric field and the liquid crystal director is always 45° at all gray levels. The liquid crystal molecules rotate in the clockwise direction as the gray level increases and the electric field must be rotated in the same direction to maintain the direction of the initial electric field at 45°. To this end, the electric field intensity of the first and second pixel electrodes is separately varied so that the direction of the initial composite electric field maintains an angle of 45° relative to the liquid crystal director at all gray levels.

In summary, the vector sum (i.e., composite electric field) of the electric field of the first pixel electrodes 131 and that of the second pixel electrodes 132 maintains a constant angle relative to the initial liquid crystal director at all gray levels and improves the response time.

As mentioned above, the FFS-mode LCD according to the present invention is advantageous in that the second pixel electrodes are positioned with a predetermined angle relative to the first pixel electrodes so that the composite electric field of the first pixel electrodes' electric field and the second pixel electrodes' electric field and the alignment direction of the liquid crystal molecules maintain the optimum state, regardless of the varying gray level, to improve the rising gray-to-gray response time.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fringe field switching mode LCD comprising:
   a lower substrate having a gate bus line and a data bus line arranged to cross each other and form unit pixels and a counter electrode and a pixel electrode positioned within each unit pixel region with an insulator interposed between them; and
   an upper substrate provided with a color filter corresponding to each pixel region and bonded to the lower substrate with a liquid crystal layer interposed between them, wherein the pixel electrode comprises:
   first pixel electrodes having a plurality of slits and positioned on the insulator while being spaced from each other; and
   second pixel electrodes having a plurality of slits and positioned between the respective first pixel electrodes, with an insulator therebetween, with a predetermined angle relative to the first pixel electrodes,
   wherein an electric field intensity of the first and second pixel electrodes is separately varied so that an angle between the composite electric field and the liquid crystal molecules is in the range of 30-60°.

2. The fringe field switching mode LCD as claimed in claim 1, wherein the first pixel electrodes are positioned on top of the second pixel electrodes with a protective layer being interposed between the first pixel electrodes and the second pixel electrodes.

3. The fringe field switching mode LCD as claimed in claim 1, wherein the predetermined angle is equal to the angle between the electric field caused by the first pixel electrodes and that caused by the second pixel electrodes and is in the range of 30-60°.

* * * * *